United States Patent
Thrasher

[19]

[11] Patent Number: 6,155,403
[45] Date of Patent: Dec. 5, 2000

[54] GOLF BALL CONVEYOR

[76] Inventor: Derone Thrasher, 2295 So MacArthur, Tracy, Calif. 95376

[21] Appl. No.: 09/328,325

[22] Filed: Jun. 9, 1999

[51] Int. Cl.[7] ............................. B65G 31/04; A63B 47/04
[52] U.S. Cl. ........................... 198/642; 198/723; 15/21.2; 473/111
[58] Field of Search .................................. 198/642, 723; 473/111; 15/21.2

[56] References Cited

U.S. PATENT DOCUMENTS

| | | | |
|---|---|---|---|
| 2,196,390 | 4/1940 | Gates | 198/642 X |
| 2,964,318 | 12/1960 | Levendoski | 473/111 |
| 3,109,649 | 11/1963 | Anderson et al. | 198/723 X |
| 3,820,183 | 6/1974 | Gustafson et al. | 15/21.2 |
| 4,158,418 | 6/1979 | Hayashi | 414/440 |
| 5,373,597 | 12/1994 | Worsham | 15/21.1 |
| 5,647,089 | 7/1997 | Hollrock | 15/302 |
| 5,766,085 | 6/1998 | Knez | 473/132 |
| 5,772,778 | 6/1998 | Bäck | 134/6 |

*Primary Examiner*—Steven A. Bratlie
*Attorney, Agent, or Firm*—Harris Zimmerman

[57] ABSTRACT

A conveyer for delivering a column of balls to an elevated location has a rotating wheel formed of resilient material. A track has a pair of curvilinear rails which extend along a portion of the circumferential surface of the wheel and which are spaced apart by distance that is smaller than the diameter of the balls. Balls are sequentially fed onto a first portion of the track at which the rails are spaced from the wheel by a distance which causes the balls to be pressed against the wheel. The edges become closer to the wheel at a second portion of the track causing increased clamping pressure against the balls at that portion of the track. A ball delivery tube extends upward from the outlet end of the track. The increased clamping pressure against balls which are momentarily below the base of the upwardly extending column of balls enables elevation of a column of balls to a greater height.

14 Claims, 3 Drawing Sheets

GOLF BALL CONVEYOR

TECHNICAL FIELD

This invention relates to apparatus for conveying objects between locations and more particularly to conveyors for delivering a column of spherical balls to an elevated location.

BACKGROUND OF THE INVENTION

Very large numbers of golf balls are needed at some types of golfing facility such as at driving ranges. Buckets of balls obtained from a storage bin are given to participants. The balls become scattered over a sizable area and are then gathered and washed and returned to the storage bin. The storage bin typically extends to a higher elevation than the ball washer. Thus washed balls must be lifted in order to be returned to the bin. Handling of the balls is more efficient and convenient if a motorized conveyor is used to return the balls from the washer to the bin.

One form of conveyor for translating golf balls has a ball guide which is curved to extend along a portion of the circumferential surface of a motor driven resilient wheel, the guide being spaced from the wheel surface sufficiently to enable a column of balls to pass between the guide and wheel. Pressure of the rotating wheel against the balls drives the balls along the guide. A ball delivery conduit extends away from the ball outlet end of the guide. The weight of the of the balls in an upwardly extending delivery conduit creates a resistance to the upward travel of the column of balls which increases as the height of the column increases. This resistance may eventually overcome the driving force exerted on the balls by the rotating wheel resulting in stalling of the column of balls. This can undesirably limit the elevation to which balls can lifted by the conveyor. The effect may, for example, dictate use of a storage bin of less than the most desirable height and capacity.

The present invention is directed to overcoming one or more of the problems discussed above.

SUMMARY OF THE INVENTION

In one aspect the present invention provides apparatus for conveying a column of spherical balls along an upwardly extending path of travel which apparatus includes a wheel centered on an axis of rotation and being rotatable thereabout. The wheel has a circumferential surface which is contacted by the balls and at least a peripheral portion of the wheel is formed of resilient material. A drive motor rotates the wheel about the axis of rotation. A curvilinear track extends along a portion of the circumferential surface of the wheel and is spaced from the surface sufficiently to enable balls to travel along the track while being in contact with both of the track and the surface. A first portion of the track is spaced from the circumferential surface of the wheel by a distance sufficient to cause a first degree of compression of the surface by balls traveling therealong. A second portion of the track is spaced from the circumferential surface of the wheel by a lesser distance to cause a greater degree of compression of the surface by balls traveling along the second portion of said track.

In another aspect the invention provides apparatus for conveying a column of spherical balls along an upwardly extending path of travel which apparatus includes a wheel revolvable about a horizontal axis of rotation and having a circumferential surface with an annular groove thereat which extends around the wheel. At least a radially outermost region of the wheel is formed of resilient material. A drive motor revolves the wheel about the axis of rotation. A pair of track members have curvilinear edges forming rails which extend along a portion of the circumferential surface of the wheel in spaced apart relationship therewith, the edges being spaced apart from each other by a distance which is smaller than the diameter of the balls. A first portion of both of the edges are spaced from the circumferential surface of the wheel by a distance which causes balls traveling between the edges and the circumferential surface to be pressed into the surface at the groove thereof. A second portion of both of the edges is spaced from the circumferential surface by a smaller distance which causes the balls to be pressed further into the surface at the groove in the surface. A ball feeder is positioned to guide a column of the balls onto the first portion of the edges. A ball delivery conduit has a ball inlet end positioned to receive balls from the second portion of the edges.

The invention provides a ball conveyor in which a curvilinear track extends along a portion of the circumferential surface of a motor driven rotatable wheel. At least the radially outermost region of the wheel is formed of resilient material. The track is spaced from the wheel in order to allow passage of a single column of balls between the track and rotating wheel with the balls being in contact with both of the track and the wheel. The track presses the balls against the resilient surface of the wheel to cause rotation of the wheel to drive the balls along the track. A ball delivery conduit extends upward from the ball outlet end of the track. A portion of the track, preferably located at the end of the track, extends closer to the wheel than other portions of the track. This creates an increased clamping pressure against one or more balls situated below the upwardly traveling column of balls. Consequently the conveyor is able to lift the column of balls to a higher elevation, against the force of gravity, than is possible in the absence of the increased clamping force. In a preferred form of the invention the track is defined by a pair of rails which are spaced apart by a distance that is smaller than the diameter of the balls and the wheel has a groove extending around the circumferential surface of the wheel. Thus opposite portions of the balls extend between the rails and into the groove of the wheel to provide secure clamping of the balls between the track and wheel. In one form of the invention the conveyor is a component of a ball washer and washed balls are fed into the entrance of the track.

The invention, together with further objects and advantages thereof, may be further understood by reference to the following description of preferred embodiments and by reference to the accompanying drawings.

DETAILED DESCRIPTION OF THE PREFERRED EMBODIMENTS

Figure 1:
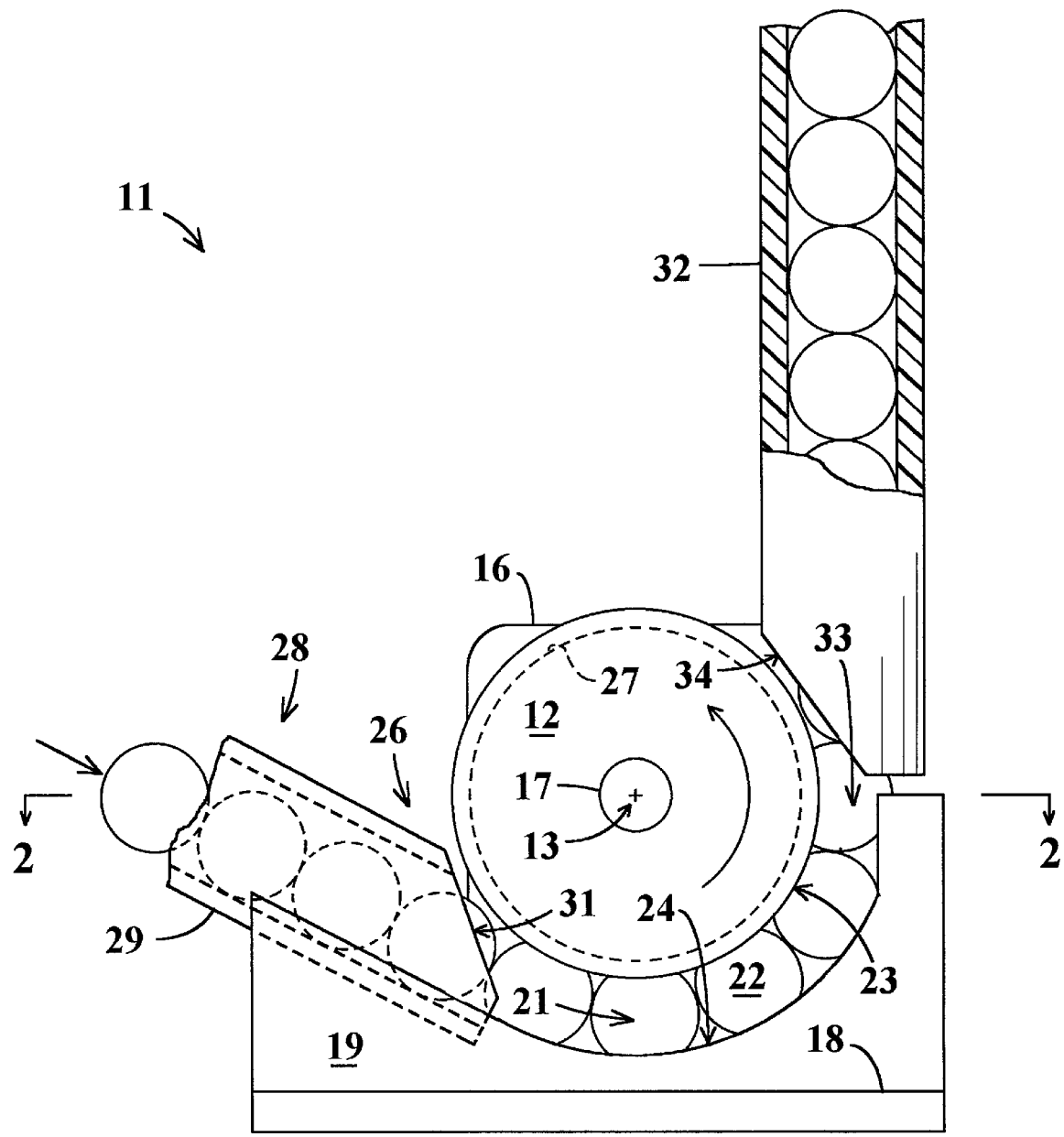
FIG. 1 is a side elevation view of a golf ball conveyor in accordance with a preferred embodiment of the invention.
Figure 2:
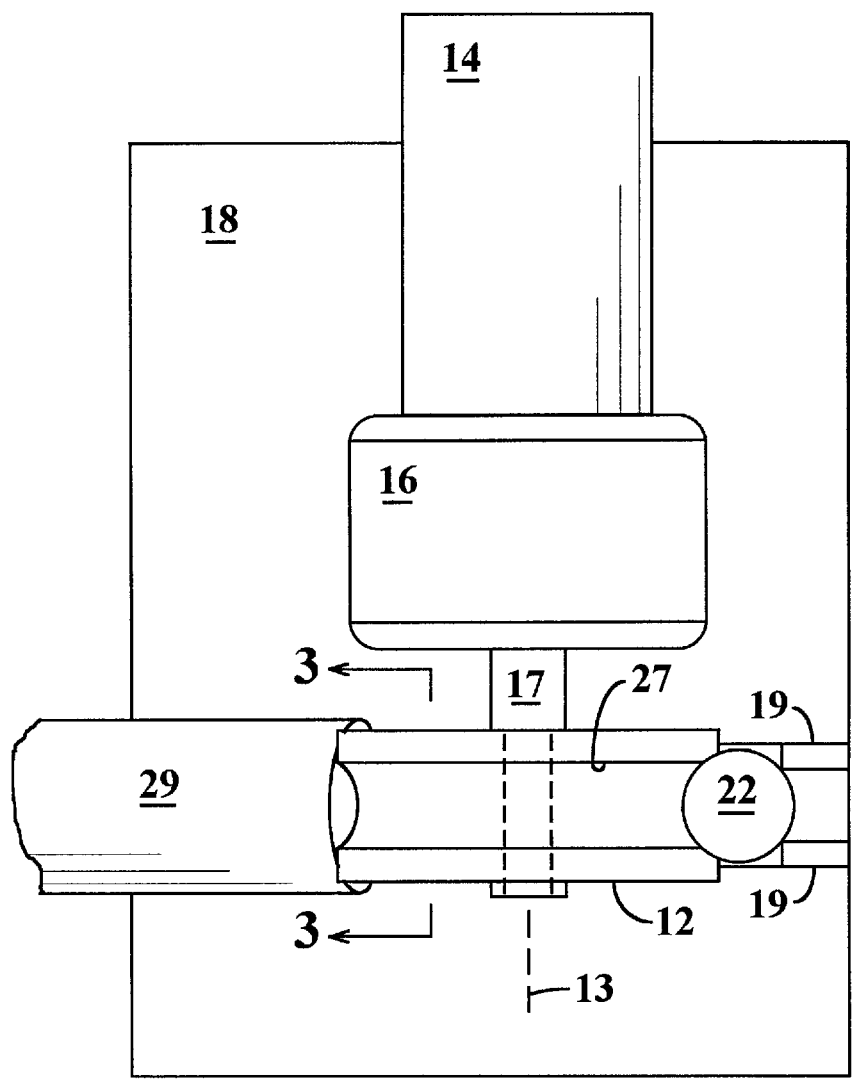
FIG. 2 is a plan view of the golf ball conveyor of FIG. 1 taken along line 2—2 of FIG. 1.

Referring initially to FIGS. 1 and 2 of the drawings, a golf ball conveyor 11 in accordance with this embodiment of the invention has a wheel 12 which is turned about a horizontal axis of rotation 13 by an electrical motor 14. The motor 14 is coupled to the wheel 12 through a speed reduction gearbox 16 and drive shaft 17 to which the wheel is secured. Motor 14 and gearbox 16 are secured to an underlying baseplate 18 in this embodiment of the invention.

Wheel 12 is formed of resilient material which in this particular example is neoprene although other resilient materials are also suitable. In an alternate form only the radially outermost region of the wheel may be formed of resilient material.

A pair of spaced apart rail members 19 extend upward from baseplate 18 to define a curvilinear track 21 for golf balls 22 which extends along a portion of the circumferential surface 23 of wheel 12. Rail members 19 are spaced apart by a distance which is smaller than the diameter of the balls 22 and have upper edges 24 which function as rails along which the column of balls 22 is traveled by turning of the wheel 12. The edges 24 are spaced from the circumferential surface 23 of wheel 12 by a distance which causes the balls to be pressed into the resilient material of the wheel except at a ball inlet end 26 of the track 21. This creates a clamping pressure on the balls 22 which forces travel of the balls along the track in response to rotation of wheel 12.

In the preferred form of the invention an annular groove 27 extends around the circumferential surface 23 of wheel 12 and balls traveling along the track 21 extend into the groove. This causes the resilient material of the wheel to exert opposing lateral forces on the balls 22 which assures retention of the balls at the track 21. The groove 27 of this example has a width which is smaller than the diameter of the balls 22 and has a cross sectional contour conforming to the contour of the balls. The groove may have other cross sectional configurations such as a V-shaped configuration for example.

Figure 3:
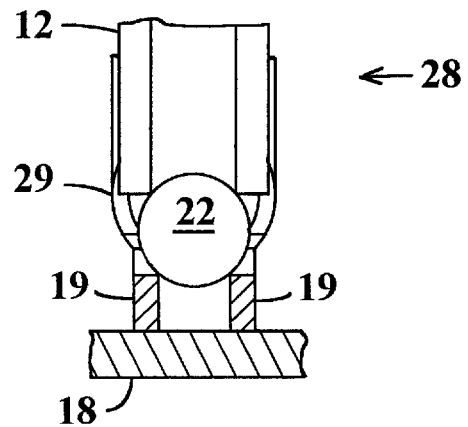
FIG. 3 is an elevation section view taken along line 3—3 of FIG. 2.

A ball feeder 28 directs balls 22 sequentially into the ball inlet end 26 of track 21 and may have a variety of different forms. In this example, with reference jointly to FIGS. 1, 2 and 3, the edges 24 of rail members 19 slant downward at the ball inlet end 26 of track 21 to enable gravity feed of balls 22 into the conveyor 11 through a downwardly sloping ball feeder tube 29 which is seated in the edges at the ball inlet end of the track. The outlet end 31 of ball feed tube 29 is preferably slanted to extend under wheel 12 for a short distance at each side of the track 21 to assure retention of the balls 22 on the track as they approach the region between the track and wheel.

Referring to FIG. 1 in particular, the rail member edges 24 in this example of the invention extend along the underside of wheel 12 and upward along the wheel to the level of the axis 13 about which the wheel rotates. This causes balls 22 to be discharged from the track 21 in a vertical direction. The discharged balls 22 enter a vertical ball delivery conduit 32 which extends upward from the ball outlet end 33 of the track 21. The ball delivery conduit 32 of this example is a hollow tube although the conduit may take other forms. The inside diameter of the tubular ball delivery conduit 32 preferably conforms substantially with the diameter of the balls 22 in order to maintain the balls in alignment with each other as they travel upward. A lower end portion 34 of the ball delivery conduit 32 may have a slanted profile to enable the lower end to be located close to the outlet end 33 of track 21.

The ball outlet end 33 of track 21 need not necessarily be at the same level as the axis of rotation 13 of wheel 12 and can be at a lower or higher location around the circumference of the wheel if it is desired that the balls 22 be discharged from the track in a direction that is not strictly vertical. The ball delivery conduit 32 need not necessarily be strictly vertical and can be inclined at an angle and/or have a non-linear configuration depending on the path of travel of the balls that is appropriate to a particular installation.

Figure 4:
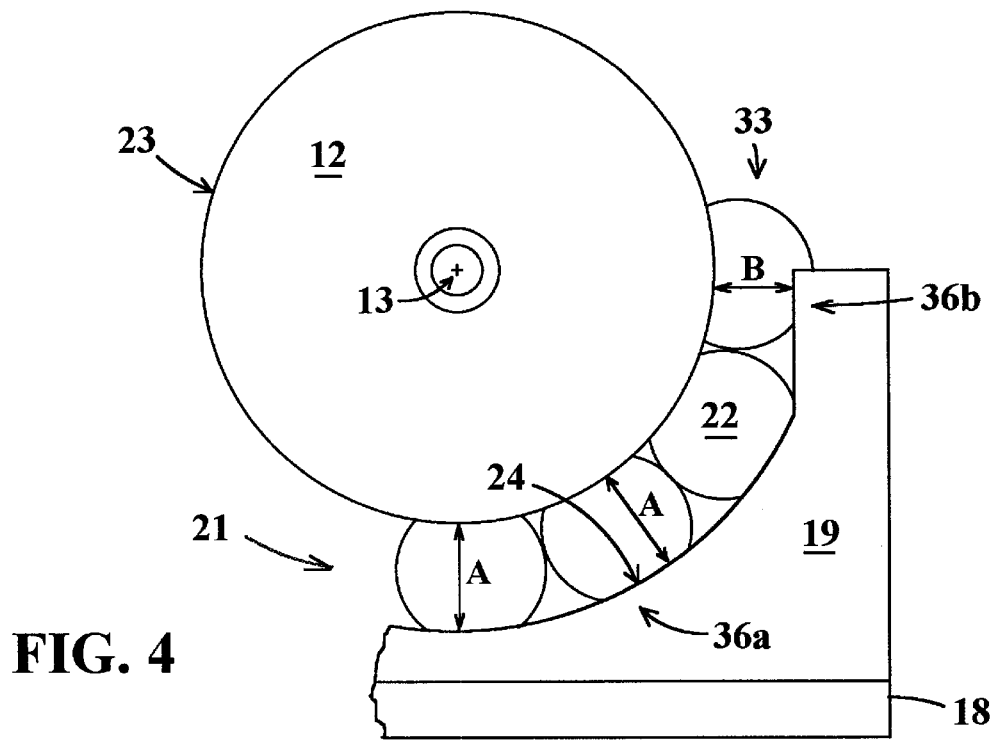
FIG. 4 is a side view of certain components of the golf ball conveyor of the preceding figures further illustrating the configuration of rail members along which balls travel through the conveyor.

As previously discussed, the weight of the column of balls 22 in ball delivery conduit 32 acts against the force which wheel 12 imparts to the balls. This effect can limit the height to which the conveyor 11 can lift a column of balls 22. At some particular height the downward gravity force matches the upward force exerted on the balls 22 by wheel 12 and stalling of the upward travel of the balls will occur. Referring to FIG. 4, the present invention provides a configuration for the track 21 which substantially increases the height to which balls 22 can be lifted.

In particular, the rail member edges 24 at a first portion 36a of the track 21 are spaced from the circumferential surface 23 of wheel 12 by a distance "A" sufficient to cause a first degree of compression of the surface by the balls 22. The edges 24 at a second portion 36b of the track 21, preferably located adjacent to the ball outlet end 33 of the track, are spaced from the circumferential surface 23 of wheel 12 by a lesser distance "B". This causes a greater degree of compression of the wheel surface 23 by balls 22 at the second portion 36b of the track 21 than occurs at the preceding portion of the track. Thus an increased clamping pressure is exerted on balls 22 at the second portion 36b of the track 21. Resistance to the downward gravitational force on the column of balls 22 is thereby increased enabling lifting of the balls 22 to greater height than would otherwise be possible.

In this example the rail member edges 24 at the first portion 36a of the track 21 are arcs having a center of curvature which is at the axis of rotation 13 of wheel 12. The edges 24 at the second portion 36b of the track are linear and parallel to a tangent of the wheel 12 thereby creating the above described constriction of the track 21 at the second portion thereof. The edges 24 may have other configurations while achieving a similar effect. For example, the edges 24 at the second portion 36b of the track may be non-linear and curve progressively closer to wheel 12 in order to create the track constriction.

Figures 5, 6:
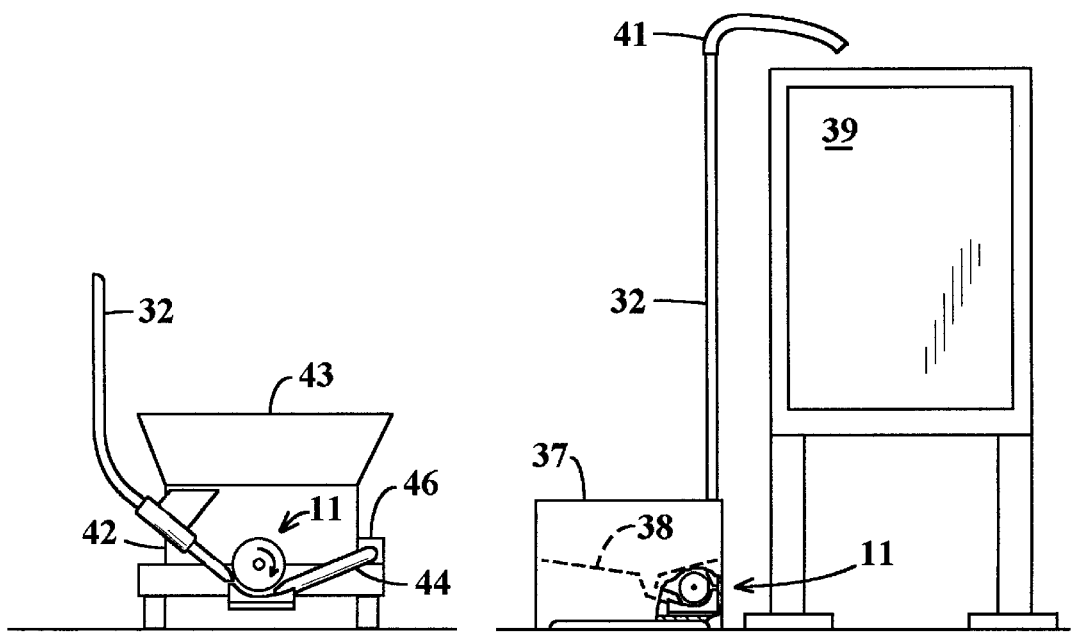
FIG. 5 is an elevation view illustrating usage of the golf ball conveyor for delivering balls from a ball receiver to an elevated storage bin.
FIG. 6 is an elevation view illustrating usage of the golf ball conveyor as a component of a ball washer for the purpose of delivering washed balls to an elevated location.

Referring to FIG. 5, the conveyor 11 may be used in a variety of different installations where large numbers of balls are to be lifted from one location to a higher elevation. In this example the conveyor 11 is situated within the lower region of a hopper 37 into which golf balls are deposited. A sloping floor 38 in hopper 37 guides the balls into the conveyor 11. The ball delivery conduit 32 extends upward from the conveyor 11 to a location which is adjacent to and higher than an elevated ball storage bin 39. A hollow sleeve 41 extends sidewardly and downwardly from the top of the ball delivery conduit 32 to release the balls at a location immediately above the bin 39 which is open at the top.

The conveyor 11 can be a component of other apparatus in which large quantities of balls are to be delivered to an elevated location. For example, with reference to FIG. 6, the conveyor 11 may be a component of a golf ball washer 42 of the type having a hopper 43 in which collected balls are deposited. A tube 44 carries balls from the washed ball outlet 46 of the washer 42 to the conveyor 11 and a ball delivery conduit 32 extends outward and upward from the conveyor to deliver the balls to a storage bin or other location. The golf ball washer 42 may be of one of the known constructions except as herein described.

The conveyor 11 has been herein described with reference to conveying of golf balls in particular. Essentially similar conveyors may be used to elevate other types of spherical balls such as baseballs or tennis balls for example.

While the invention has been herein described with reference to certain specific embodiments for purposes of example, many modifications and variations of the apparatus are possible and it is not intended to limit the invention except as defined in the following claims.

I claim:

1. Apparatus for conveying a column of spherical balls along an upwardly extending path of travel comprising:

a wheel centered on an axis of rotation and being rotatable thereabout, said wheel having a circumferential surface which is contacted by said balls, at least a peripheral portion of said wheel being formed of resilient material, a drive motor coupled to said wheel for rotating said wheel about said axis of rotation, a curvilinear track extending along a portion of said circumferential surface of said wheel and being spaced from said surface sufficiently to enable balls to travel along said track while in contact with both of said track and said surface, said track having a ball inlet end at which incoming balls are received and a ball outlet end at which balls leave said track, a first portion of said track being spaced from said circumferential surface of said wheel by a distance sufficient to cause a first degree of compression of said surface by balls traveling therealong and a second portion of said track being spaced from said circumferential surface of said wheel by a lesser distance to cause a greater degree of compression of said surface by balls traveling along said second portion of said track.

2. The apparatus of claim 1 wherein said second portion of said track is adjacent to said ball outlet end of said track.

3. The apparatus of claim 1 wherein said circumferential surface of said wheel has a groove extending therearound into which said balls extend.

4. The apparatus of claim 1 wherein said track has a pair of rail members with ball contacting edges which form curvilinear rails extending along said portion of said circumferential surface of said wheel, said rails being spaced apart from each other by a distance which is smaller than the diameter of said balls.

5. The apparatus of claim 4 wherein said portions of said rails which are closest to said ball outlet end of said track are closer to said circumferential surface of said wheel than portions of said rails which are closer to said ball inlet end of said track.

6. The apparatus of claim 5 wherein said rails at said first portion of said track are uniformly spaced from said circumferential surface of said wheel and wherein the rails become progressively closer to said circumferential surface of said wheel at said second portion of said track.

7. The apparatus of claim 1 wherein said circumferential surface of said wheel has a groove extending therearound into which said balls extend, said groove having a width which is smaller than the diameter of said balls and wherein said track has spaced apart rails extending along said portion of said circumferential surface of said wheel in spaced apart relation therewith and in spaced apart relationship with each other, the spacing of said rails from each other being smaller than the diameter of said balls.

8. The apparatus of claim 1 further including an upwardly extending ball delivery conduit extending along said path of travel, said ball delivery conduit having a ball receiving end positioned to receive balls which leave said track at said ball outlet end thereof.

9. The apparatus of claim 8 wherein said ball delivery conduit is a tube having an inside diameter which substantially conforms with the diameter of said balls.

10. The apparatus of claim 8 wherein said ball delivery conduit has a ball outlet end situated above a ball storage bin.

11. The apparatus of claim 1 wherein said axis of rotation of said wheel is horizontal and wherein said track has spaced apart edges forming rails which extend along said portion of said circumferential surface of said wheel below said wheel and in spaced apart relationship therewith, the spacing of said rails from each other being smaller than the diameter of said balls and wherein an initial portion of said rails at which said balls are received slants downward in the direction of travel of said balls.

12. The apparatus of claim 1 wherein said wheel and curvilinear track are secured to a ball washer having a washed ball outlet, further including a washed ball guide extending from said washed ball outlet to said ball inlet end of said track, and a ball delivery tube extending upwardly from said ball outlet end of said track to deliver washed balls to a location which is higher that said ball washer.

13. Apparatus for conveying a column of spherical balls along an upwardly extending path of travel comprising:

a wheel revolvable about a horizontal axis of rotation and having a circumferential surface with an annular groove thereat which extends around said wheel, at least a radially outermost region of said wheel being formed of resilient material, a drive motor coupled to said wheel to revolve said wheel about said axis of rotation, a pair of track members having curvilinear edges forming rails which extend along a portion of said circumferential surface of said wheel in spaced apart relationship therewith, said edges being spaced apart from each other by a distance which is smaller than the diameter of said balls, a first portion of both of said edges being spaced from said circumferential surface of said wheel by a distance which causes balls traveling between said edges and said circumferential surface to be pressed into said surface at said groove thereof, a second portion of both of said edges being spaced from said circumferential surface by a smaller distance which causes the balls to be pressed further into said surface at said groove thereof, a ball feeder positioned to guide a column of said balls onto said first portion of said edges, and a ball delivery conduit extending along said path of travel and having a ball inlet end positioned to receive balls from said second portion of said edges.

14. The apparatus of claim 13 further including a ball washer having a washed ball outlet and wherein said ball feeder is positioned to guide washed balls from said washed ball outlet to said first portion of said track member edges.

* * * * *